DIGITAL DEVICE

Filed Oct. 21, 1965 2 Sheets-Sheet 1

INVENTORS.
BERNARD M. GORDON
IVAN H. KIRSCH
BY
Robert J. Schiller
ATTORNEY

April 21, 1970 B. M. GORDON ET AL 3,508,247

DIGITAL DEVICE

Filed Oct. 21, 1965 2 Sheets-Sheet 2

INVENTORS.
BERNARD M. GORDON
IVAN H. KIRSCH
BY
Robert J. Schiller
ATTORNEY 3,508,247

DIGITAL DEVICE

Bernard M. Gordon, Magnolia, and Ivan H. Kirsch, Hyde Park, Mass., assignors, by direct and mesne assignments, to Gordon Engineering Company, Waltham, Mass., a limited partnership Filed Oct. 21, 1965, Ser. No. 499,772
Int. Cl. B41b *27/10;* C06f *7/12;* H03k *13/24*
U.S. Cl. 340—347 14 Claims

ABSTRACT OF THE DISCLOSURE

An apparatus for controlling a printer comprises a clock pulse generator having a rate that is determined by AC line power frequency, a divider to producing four reference pulse sequences in binary coded decimal format, four AND gates for receiving the reference pulse sequences as well as information input signals, and an OR gate for buffering the pulse trains from the AND gates in order to produce a decimal sequence of stepping pulses.

This invention relates to code conversion devices, and more particularly to apparatus for converting a digital code to decimal form and for actuating known printing devices for providing a printed representation of the decimal form.

A number of devices are known to be capable of accepting input signals in coded form, for example as binary coded decimal electrical signals, and converting these signals to a printed format in decimal notation. Typically, such devices have required expensive components such as DC power supplies for operating the printing mechanism and complex timing circuits for controlling the decoding and printing operations.

The present invention has as its principal object a device intended for use with ordinary AC line power (such as 110 volt, 60 cycle AC) from which both operating power and timing rates are directly derived, thus reducing both cost and complexity of such decoding print control devices.

To this end, the present invention comprises means for converting line AC to a first serial pulse train having a repetition rate equal to or an integral submultiple of the line frequency, means for dividing each consecutive sequence of ten such pulses into a number of pulse subtrains each in its own channel according to the code in which the input signals to the device are cast, means for generating a serial decimal pulse train from said subtrains and said input signals which decimal pulse train has a number of pulses which is the decimal digit equivalent of the coded input signal, means for actuating a ten-position decimally coded printing wheel to index the wheel to a rotational position corresponding to the decimal digit, means responsive to the first serial pulse train for sequentially printing out the decimal digit corresponding to the rotational position of the wheel, and means responsive to the first serial pulse train for resetting the rotational position of the wheel to a position corresponding to decimal zero.

More particularly, the present device comprises a pulse generator operated by and responsive to standard AC line power for generating the first serial pulse train. The pulse train is fed to a decade divider system which provides the plurality of subtrains of pulses. For example, if the input code to the device generally is in so-called 8–4–2–1 form, the subtrains, have respective 8, 4, 2, and 1 pulses therein for each consecutive ten input pulses to the decade divider. The subtrains are then fed to gates operated by the input code signal so as to provide a decimal serial pulse train, i.e. the decimal digit equivalent of the input code signal. This decimal serial pulse train is used to control the indexing of a decimal code wheel according to a timing operation provided by first bistable means responsive to the output of the decade divider. Power for the indexing is taken from the AC line and control of the power is achieved by feeding it through a rectifier having a control lead connected to the source of the decimal pulse train.

Similarly, printing of indicia indexed on the code wheel is achieved with power taken from the AC line and also controlled by rectifiers having control leads connected to second bistable means operated responsively to the first bistable means and the decade divider.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
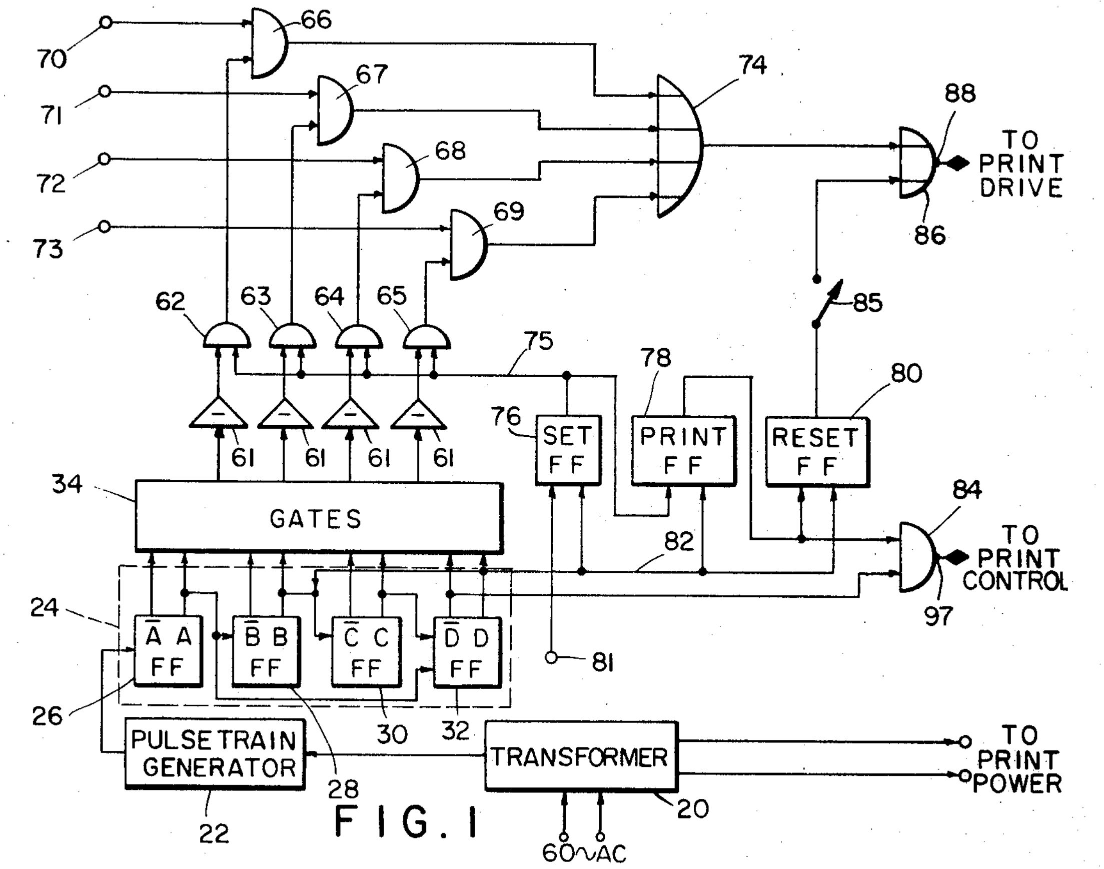
FIG. 1 is a schematic diagram of one embodiment of the present invention showing the decoding and control logic elements.

Referring now to the drawing, there is shown in FIG. 1 an embodiment of the present invention including transformer 20 adapted to accept standard AC line power, such as at 50 or 60 cycles, 110 volts, and provides, if necessary reduced voltage output. A secondary winding of the transformer is connected to an input of means, such as pulse generator 22, for converting the transformed line voltage to a serial pulse having a repetition rate that is the same as or an integral fraction of the fundamental frequency of the line voltage. Generator 22 typically can be a Schmitt trigger, or other known type of axis-crossing detector controlling a bistable device, and differentiating means for converting the rectangular wave output of the bistable device into pulses.

The serial pulse train is to be divided into successive sequences of ten pulses each, and for this purpose, the output of generator 22 is connected to the input of a decimal or decade divider chain or counter 24. The latter typically comprises four bistable devices or flip-flops interconnected in such manner as to provide a unique combination of output signals for each input pulse of a sequence of ten. Each flip-flop has the usual pair of output terminals (commonly called assertion and negation terminals) alternately and uniquely energized according to the state of the flip-flop. Thus, flip-flops 26, 28, 30, and 32 respectively have assertion output terminals A, B, C, and D and negation output terminals $\overline{A}$, $\overline{B}$, $\overline{C}$, and $\overline{D}$. The flip-flops are connected serially such that first flip-flop 26 has a common input terminal connected to generator 24 and its assertion output terminal A is connected to a common input terminal of flip-flop 28. Similarly, assertion output terminal B of the latter is connected to common input terminal of flip-flop 30, and assertion output terminal C of flip-flop 30 is also connected to set input terminal of the last flip-flop 32. While a four-stage cascade of flip-flops as described will ordinarily count to 16 before resetting, it can be forced to recycle on the ninth input pulse (thereby resetting to zero and and effectively counting only to ten) by the use of a feedback connection between assertion output terminal D of flip-flop 32 (or the last stage) and the input terminal of the second stage or flip-flop 28, and a feed-forward connection between assertion output terminal A of the first stage or flip-flop 26 and the reset input terminal of flip-flop 32. This type of counter arrangement is fully described in U.S. Patent No. 2,538,122, issued Jan. 16, 1957, to J. T. Potter.

The outputs of the flip-flops of counter 24 are connected to gating device 34 for providing four output channels each conveying a subtrain of pulses distributed according to the code system which the printer device is intended to convert to decimal form, i.e. the number of pulses in each channel corresponds to the maximum numerical value of each digit of the code system. For example, if the code to be converted by the printer to decimal output is in 8–4–2–1 form, the respective output channels of the gating device will have 8, 4, 2, and 1 pulses appearing thereon for each sequence of ten input pulses to the divider or counter 24. Other code systems such as 4–2–2–1 and 5–2–1–1 can be used by appropriate changes in gating connections.

Figure 4:
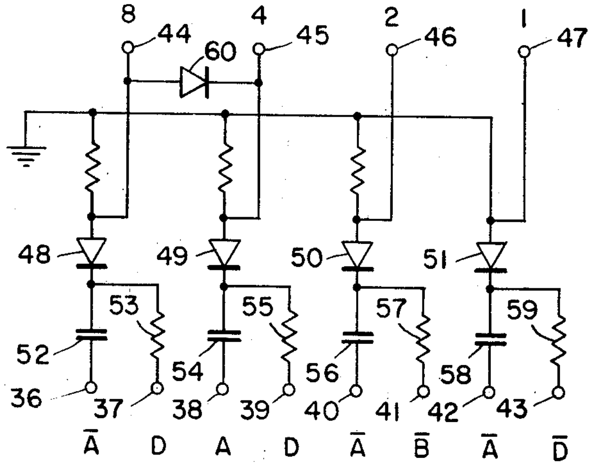
FIG. 4 is a schematic circuit diagram illustrating in detail certain gating structure of the embodiment of FIG. 1.

An exemplary circuit for gating device 34 is shown in FIG. 4 and comprises eight input terminals 36, 37, 38, 39, 40, 41, 42, and 43 adapted to be connected to selected output terminals of the four flip-flops of counter 24 in a logical manner contemplating combining the flip-flops output to obtain the requisite distribution of pulse subtrains on four output terminals 44, 45, 46, 47 of gating device 34. Gating device 34 comprises at least four AND gates formed respectively of diodes 48, 49, 50, and 51. The cathode of diode 48 is coupled through resistor 53 to terminal 37. The cathode of diode 49 is coupled through capacitor 54 to terminal 38 and is also connected through resistor 55 to terminal 39. In like manner, terminals 40 and 41 are coupled respectively through capacitor 56 and resistor 57 to the cathode of diode 50, and terminals 42 and 43 are coupled respectively through capacitor 58 and resistor 59 to the cathode of diode 51. The anodes of diodes 48, 49, 50, and 51 are respectively connected to output terminals 44, 45, 46, and 47, also through appropriate resistors to ground. In the form shown, terminal 45 is also connected through diode 60 to terminal 44 so that any pulses at terminal 45 will also appear at terminal 44.

Referring again to FIG. 1, each output terminal of gating devices 34 is connected to an input terminal of respective one of a set of four inverting amplifiers 61 and the output terminal of each amplifier is connected to one input terminal of a respective one of four AND gates 62, 63, 64, and 65. The output of each of the latter AND gates is connected to one first input terminal of respective ones of another set of four AND gates 66, 67, 68, and 69. Each of AND gates 66, 67, 68, and 69 has a second input respectively connected to printer input terminals 70, 71, 72, and 73. The outputs of AND gates 66, 67, 68, and 69 are buffered together through OR gate 74.

In operation of the device as thus described, one applies a binary coded signal, e.g. in 8–4–2–1 code, at terminals 70, 71, 72, and 73. It can be assumed for ease in understanding, that the signal is binary nine, i.e. 1001, the binary one being a voltage level more positive than the binary zero. Preferably, the binary one level is 2.5 volts more positive than binary zero within a range of from about +12 to −12 volts. Thus, if each level representing a binary digit is applied at a respective one of the input terminals, terminals 66 and 69 will have the more positive voltage (i.e. be energized) and terminals 67 and 68 will have the lesser positive (or more negative voltages) and therefore can be considered not energized.

Figure 3:
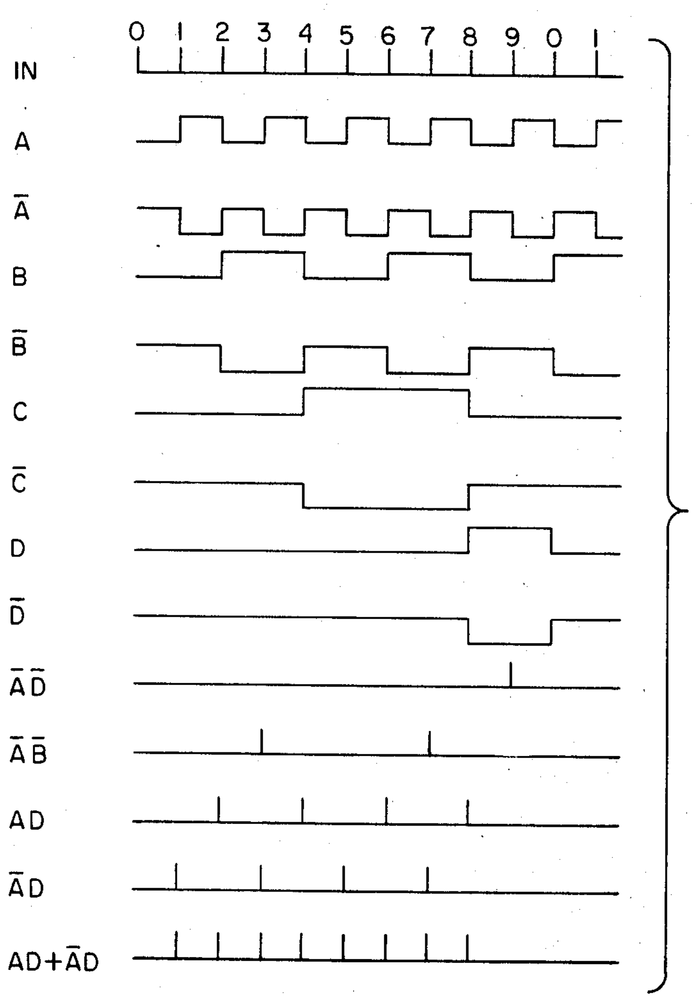
FIG. 3 is a timing diagram of a number of pulse trains and wave-forms of the embodiment of FIG. 1, all on a common time axis.

Transformer 20, connected to an appropriate 60 cycle power line will provide 60 cycle AC to generator 22. The latter in turn provides a serial pulse train having a pulse repetition rate of for example 60. The portion of pulse train fed to counter 24 and thus to the common input terminal of flip-flop 26, is shown schematically in FIG. 3 and designated IN. The wave-forms of FIG. 3 are each identified by the designation of the terminal or terminals at which they appear.

The pulses of the train activate flip-flop 26 so that at assertion terminal A of the latter there appears a square wave having alternate transitions substantially simultaneously with each pulse, the wave being of one polarity. Simultaneously, at negation terminal $\overline{A}$ of flip-flop 20 there will be a similar square wave, but of opposite polarity. Flip-flop 28 will change state only upon application of a negative-going transition at its input terminal, hence produces respectively at its assertion and negative terminals, B and $\overline{B}$, rectangular wave forms as shown, identical but for polarities, each having four alternate transitions timed to be substantially simultaneous with the second, fourth, sixth, and eighth input pulses to the counter. In like manner, because flip-flop 30 is trigged by only the negative-going transistion at terminal B of the preceding flip-flop, assertion and negation terminals, C and $\overline{C}$ respectively of flip-flop 30 will show opposite polarity rectangular wave-forms each having only two transitions, i.e. substantially coincident with the fourth and eighth pulses of the input sequence of the counter. Lastly, flip-flop 32 will exhibit a pair of rectangular pulse trains at terminals D and $\overline{D}$ of opposite polarity, each having but two transistions coincident with the eighth and zero pulses of the input train. By virtue of the feedback loop, the negative transistion of the wave form at terminal D will inhibit operation of the second flip-flop so that the latter does not respond to the coincident pulse from flip-flop 26. The feed-forward loop provides an input transition from the A terminal of flip-flop 26 which triggers the transitions at terminals D and $\overline{D}$ on the zero pulse. Thus, on the last or zero pulse of the input train, the counter is reset to its zero state.

To convert the binary coded decimal signal at terminals 44, 45, 46, and 47 to a serial decimal pulse train, it is necessary to provide four output subtrains from divider 24 which are coded in the same binary coded decimal manner. To this end, negation terminal $\overline{A}$ is connected to gate input terminals 36, 40, and 42; assertion terminal D is connected to gate input terminals 37 and 39; and assertion terminal A and negation terminals $\overline{B}$ and $\overline{D}$ are connected respectively to gate input terminals 38, 41 and 43. Each negative-going transition applied to one of the gate capacitors provides pulse triggering for that gate when it raises, in sum with the signal applied to a paralleling resistor, the cathode potential of the proper diode to allow the latter to conduct in a forward direction.

Consequently, for each sequence of the input pulses to divider 24, diode 51 will be biased into forward conduction by the wave trains at terminals $\overline{A}$ and $\overline{D}$ and pass but one pulse to terminal 47, diode 50 will be actuated by the wave trains at terminals $\overline{A}$ and $\overline{B}$ and pass two pulses to terminal 46, and diode 49 will, being actuated by the wave trains at terminals A and D, pass a subtrain of four pulses to terminal 45. Although diode 48, being controlled by the wave trains at terminals $\overline{A}$ and D, will pass four pulses, these latter are gated together by diode 60 with the pulses at terminal 45 to provide a subtrain of 8 pulses at terminal 44.

Inverter amplifiers 61 are desirable to invert the pulses of the subtrains to provide gating signal compatibility Gates 62, 63, 64, and 65 are all connected at their other input terminals to common line 75 so as to be enabled by a signal along the latter. Thus, when enabled, gates 62, 63, 64, and 65 will pass respective eight, four, and two and one pulse subtrains.

Because, in the exemplary embodiment using an input signal of binary nine only gates 66 and 69 are enabled by the signals at terminals 70 and 73 whilst gates 67 and 68 are disabled. Thus, only the pulse trains of eight pulses and one pulse will be buffered together at OR gate 74, producing the desired nine pulses representing the decimal conversion of the binary 1001 signal. In like manner, any binary coded decimal signal applied to input terminals 70, 71, 72, and 73 will be converted to a decimal pulse train appearing at the output of gate 74.

The invention as thus described is useful to actuate a known data printer for example of the type available from the Presin Company, Inc., Bridgeport, Conn. The latter includes a rotatable print wheel having decimal numerals from one to zero about its periphery, a solenoid drive for moving or stepping the wheel to a predetermined position, and solenoid driven means for printing the numeral stepped to a print location. As means for actuating and controlling the indexing of the wheel of the printer and for controlling the printing operation, the present invention includes three bistable devices or flip-flops: set flip-flop 76, print flip-flop 78 and reset flip-flop 80. Set flip-flop 76 has set and reset input terminals respectively connected to control input terminal 81 and to terminal D of counter 24 through common line 82. One output terminal of flip-flop 76 is connected to line 75 and also to the set input terminal of print flip-flop 78. An output terminal of flip-flops 78 in turn is connected to the set input terminal of reset flip-flop 80 and to one input of AND gate 84. The reset input terminals of flip-flops 76 and 78 are connected to common line 82. The other input terminal of gate 84 is connected to terminal $\overline{D}$ of counter 24. Lastly, the output terminal of flip-flop 80 is connected through switch 85 to the one input terminal of OR gate 86, the other input terminal of OR gate 86 being connected to the output terminal of OR gate 74.

Referring again to the exemplary values used in the earlier description of the operation of the invention, it will be apparent that gates 62, 63, 64, and 65 can pass no pulse subtrains unless they are commonly enabled. Flip-flop 76 provides no enabling signal to line 75 until a start or operate signal is applied at terminal 81. Such a start signal will trigger flip-flop 76 to provide, for example, a positive-going transition to a level providing the necessary enabling output to line 75. The start signal should be timed, by known means (not shown) to occur about one-half pulse time prior to the first pulse to counter 24 of a sequence of ten pulses. This then enables gates 62, 63, 64, and 65 to pass the four pulse subtrains. On the tenth or zero pulse in the sequence to the counter, terminal $\overline{D}$ provides a negative-going transiton which, as a signal along line 82, changes the state of flip-flop 76 and, as the latter returns to a more negative level, removes the enabling signal from gates 62, 63, 64, and 65. The interval of the ten pulse sequence allows a decimal pulse train to be created at the output of OR gate 74. This latter pulse train, the decimal equivalent of the binary coded decimal signal at terminals 70, 71, 72, and 73 passes through OR gate 86 to control the print drive function of the printer, i.e. the indexing or stepping of the print wheel.

Figure 2:
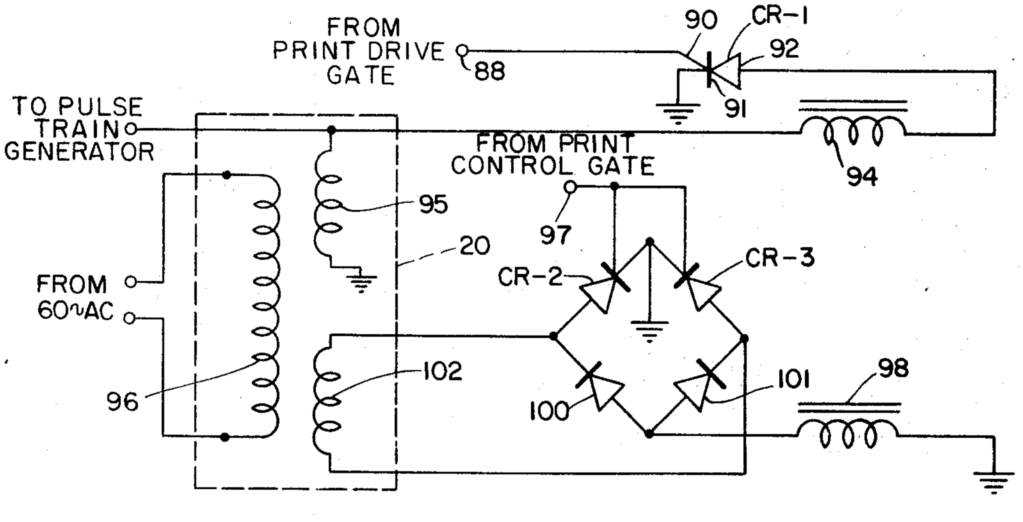
FIG. 2 is a schematic circuit diagram showing the indexing and printing power elements and their controlling connections to the logical elements of FIG. 1.

Referring now to FIG. 2 it will be seen that output terminal 88 of gate 86 is connected to gate lead 90 of a gated unilateral current conductive device, such as controlled rectifier CR–1.

Generally, a controlled rectifier has an anode, cathode and gate lead and is characterized in that when reversed biased, anode-cathode conduction is blocked in substantially the same manner as an ordinary rectifier. However, when forward-biased within limits, anode-cathode conduction is still blocked until a comparatively small trigger signal is applied to the gate lead. The controlled rectifier will then conduct in the forward direction much as an ordinary rectifier; cessation of the gate signal does not substantially affect forward conduction. The latter ceases when the forward ourrent flcw is interrupted and is not renewed upon application of forward bias until a trigger signal once again enables the gate. Examples of controlled rectifiers are well known and exemplified by solid-state silicon controlled rectifiers such as those readily available from the General Electric Company.

Cathode 91 of rectifier CR–1 is connected to ground and anode 92 is connected to means for actuating the print wheel of a printer. The latter means is shown schematically as solenoid 94, one end of which is connected to the anode of CR–1, the other end of which is connected to one side of secondary winding 95 of transformer 20. The other side of secondary winding 95 is grounded to complete the circuit. Transformer 20, of course, includes a primary winding 96 inductively coupled to winding 95. Thus, gate lead 90 will be activated a number of times equal to the number of pulses in the train through OR gate 86 and set the print wheel to a corresponding decimal position. This occurs because the pulses at gate lead 90 are synchronized with the AC waveform from secondary winding 95 which alternately reverses and stops forward conduction through CR–1 between each pulse at the gate lead.

The same negative-going transition at the output of set flip-flop 76 which disables gates 62, 63, 64, and 65 also actuates the set input of print flip-flop 78. The level of the output of the latter therefore goes positive and is applied to print control gate 84. Assuming the latter to be in enabled condition at the tenth pulse of the sequence to counter 24 (coincident with the negative going transition at the output of flip-flop 76 which turns flip-flop 78 "on") the output of flip--flop 78 will appear at output terminal 97 of gate 84. The latter is connected to means for actuating a device for printing out the indicia or numeral appearing on the print wheel as positioned by solenoid 94.

In the preferred embodiment, printing is achieved by actuation of means, shown schematically as solenoid 98, one side of which is connected to ground and the other side of which is coupled to a controlled power source. The latter comprises a full-wave rectifier bridge formed of a pair of diodes 100 and 101, the anodes of which are connected to one another and to the other side of solenoid 98. The cathodes of diodes 100 and 101 are each connected to an opposite end of another secondary winding 102 of transformer 20. The bridge is completed with a pair of controlled rectifiers CR–2 and CR–3 connected cathode to cathode and having their anodes respectively coupled to the cathodes of diodes 100 and 101. The control leads of rectifiers CR–2 and CR–3 are in turn coupled to one another and to terminal 97.

Thus, the output of gate 84 will trigger the gate leads of controlled rectifiers to actuate solenoid 98 but only after solenoid 94 has moved or indexed the print wheel to its proper position according to the pulse train through gate 88. It will be apparent that rectifiers CR–2 and CR–3 alternately are triggered into conduction synchronously with the AC waveform from secondary winding 102 as the signal level provided by gate 84 continues. The actuation of solenoid 98 continues until gate 84 is disabled and both rectifiers CR–2 and CR–3 no longer can conduct. Because the latter is connected to the $\overline{D}$ terminal of counter 84, a negative-going transition will appear at one input terminal of gate 84 on the eighth count of a second consecutive sequence of ten input pulses (i.e. the eighteenth pulse) to counter 24. Obviously, because gates 62, 63, 64, and 65 are disabled during this second sequence, no input pulses are fed to the gate lead of controlled rectifier CR–1 and only print control gate 84 is enabled during this period. It is preferred to disable gate 84 on the eighth count of the second sequence to allow the mechanism actuated by solenoid 98 a recovery period and to provide time for the AC waveform to back-bias rectifiers CR–2 and CR–3 to shut them off. On the last or zero count of the second sequence, terminal D of counter 24 provides a negative going signal to the reset terminal of flip-flop 78, changing the flip-flop output to its other state and removing the signal level from gate 84.

Because the output of flip-flop 78 is also connected to the set input terminal of reset flip-flop 80, it will be apparent that the negative-going transition from the output of the latter on the tenth pulse of the second sequence (the twentieth pulse input to counter 24) will trigger flip-flop 80 to provide a positive output signal. Now, in counter print modules of the type described, the print wheel bears a cam which holds switch 85 open only when the wheel is at an angular position corresponding to the printout of decimal numeral zero. Thus, if the print wheel has been set by solenoid 94 to any other position, switch 85 will be closed. The signal provided as a positive level from flip-flop 80 therefore passes through OR gate 86 and causes the print wheel to rotate until switch 85 is cammed open at the zero position of the wheel. This resets the wheel for indexing the next pulse train from gate 74. Again on the tenth pulse of a third consecutive sequence of input pulses to counter 24 (or the thirtieth pulse) the signal on terminal D resets flip-flop 80 removing the more positive signal level from the output of the latter.

While the invention has been described as operating in set, print and reset sequence, it will be obvious to those skilled in the art that with minor modification, the sequence of operations can be reset, set and print.

For simplicity in exposition, the description relates to the conversion of but one coded number and the printing of that number as a single decimal digit, although clearly a plurality of coded numbers can be applied to an equal plurality of gate assemblies all passing the coded subtrains according to any of a number of multiplexing methods to operate an equal plurality of print modules, thereby providing a decimal output of many digits.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus for decoding a binary type coded signal to pulses coded in decimal form, and for controlling first motor means for indexing means for converting said pulses to positions, said apparatus comprising in combination; means for converting standard AC line power to a first serial pulse train having a repetition rate equal to or an integral submultiple of the frequency of said line power; decade divider means for converting each consecutive sequence of ten pulses into a plurality of subtrains of pulses each in its own channel, the number of pulses in each subtrain corresponding to the maximum number of each digit of the code of said signal; a plurality of decoding and gates, each having one input terminal connected to a corresponding one of said channels, each having another input terminal adapted to have applied thereto a respective digit portion of said binary type signal; buffer means for combining all of the outputs of said gates into a second serial pulse train; means for switching said line power to actuate said first motor means; and means for applying said second pulse train to actuate said means for switching, said decade divider means comprising four bistable stages each having an input terminal, a negation output terminal and an assertion output terminal, and being connected as decimal counters, and at least four gates each having a pair of inputs terminals connected to a predetermined pair of the output terminals of said four bistable stages, said binary type decimal coded signal being in 8–4–2–1 form, said gates being encoding AND gates, the input terminals of a first of which are connected respectively to the negation and assertion output terminals of the first and fourth bistable stages in said divider means, the input terminals of a second of which are connected respectively to the assertion output terminals of both the first and the fourth bistable stages in said divider means, the input terminals of a third of which are connected respectively to both negation output terminals of the first and second bistable stages in said divider means, and the input terminals of a fourth of which are connected respectively to both negation output terminals of the first and fourth bistable stages in said divider means; and a unilateral conductive device connected between the output terminals of the first and second gates to impress an output signal from the second gate onto the output terminal of the first gate.

2. Apparatus for decoding a binary type coded signal to pulses coded in decimal form, and for controlling first motor means for indexing means for converting said pulses to positions, said apparatus comprising in combination; means for converting standard AC line power to a first serial pulse train having a repetition rate equal to or an integral submultiple of the frequency of said line power; decade divider means for converting each consecutive sequence of ten pulses into a plurality of subtrains of pulses each in its own channel, the number of pulses in each subtrain corresponding to the maximum number of each digit of the code of said signal; a plurality of decoding AND gates, each having one input terminal connected to a corresponding one of said channels, each having another input terminal adapted to have applied thereto a respective digit portion of said binary type signal; buffer means for combining all of the outputs of said gates into a second serial pulse train; means for switching said line power to actuate said first motor means; and means for applying said second pulse train to actuate said means for switching, said means for switching said line power to said first motor means being a controlled rectifier having a control lead, an input terminal adapted to be connected to the source of said line power, and an output terminal connected to said first motor means; said means for applying said second pulse train comprising an OR gate having one input connected to the output of said buffer means and having its output connected to said control lead.

3. Apparatus for decoding a binary type coded signal to pulses coded in decimal form, and for controlling first motor means for indexing means for converting said pulses to positions, said apparatus comprising in combination; means for converting standard AC line power to a first serial pulse train having a repetition rate equal to or an integral submultiple of the frequence of said line power; decade divider means for converting each consecutive sequence of ten pulses into a plurality of subtrains of pulses each in its own channel, the number of pulses in each subtrain corresponding to the maximum number of each digit of the code of said signal; a plurality of decoding AND gates, each having one input terminal connected to a corresponding one of said channels, each having another input terminal adapted to have applied thereto a respective digit portion of said binary type signal; buffer means for combining all of the outputs of said gates into a second serial pulse train; means for switching said line power to actuate said first motor means; means for applying said second pulse train to actuate said means for switching; means for controlling second motor means for actuating a device providing decimal indicia uniquely corresponding to the position of said converting means; three bistable devices having set and reset input terminals and output terminals, said bistable devices being connected in cascade, the reset input terminal of said bistable devices being connected to said divider means for actuation on the last pulse of each sequence; gating means connected to the output terminal of a first of said bistable devices and between said decade divider means and AND gates so as to pass said subtrains to said gates only when enabled responsively to actuation of the set input terminal of said first device; means for switching said line power to said second motor means; means for applying the output of the bistable device next in said cascade after said first device to said means for switching power to said second motor means; and switch means for connecting the output terminal of the third of said bistable devices to said means for switching line power to said first motor means, said switch means being connected to said converter so as to open only when the position of said converter corresponds to decimal zero.

4. Apparatus as defined in claim 3 wherein said means for switching said line power to said second motor means comprises a full wave rectifier bridge having a pair of controlled rectifiers each in a respective arm of said bridge, the control leads of said controlled rectifiers being connected to each other; and wherein said means for applying the output of the bistable device next in said cascade after said first device comprises an AND gate having a pair of inputs respectively connected to the output of said bistable device next in said cascade and to an output terminal of said divider means, and having an output terminal connected to said control leads of said pair of controlled rectifiers.

5. Apparatus as defined in claim 3 wherein said first of said bistable devices is arranged so as to provide an enabling signal to said gating means when the set input terminal thereof is actuated and the reset terminal of said first bistable device is connected to said divider means so that said enabling signal is removed from said gating means coincidentally with the tenth pulse of a sequence of pulses to said divider means; said means for applying the output of said bistable device next in said cascade comprises a control AND gate connected at one input terminal of the output of said bistable device next in said cascade; and said bistable device next in cascade is connected to said first bistable device so as to provide a signal to said control AND gate for actuating said means for switching line power to said second motor means upon removal of said enabling signal from said gating means, said control and gate having another input terminal connected to said divider means so that said control AND gate is disabled upon occurrence of an input pulse to said divider means before a tenth pulse of a sequence.

6. Apparatus for controlling a readout, said apparatus comprising converting means for generating a clock pulse train of predetermined rate in response to an application of AC line power of predetermined frequency, said rate being functionally related to said frequency, divider means for generating a plurality of reference pulse subtrains in response to an application of said clock pulse train, said reference pulse subtrains being predeterminedly coded, input means for a plurality of selected signals corresponding to selected input information, gate means for processing corresponding ones of said selected signals and ones of said reference pulse subtrains in order to generate a plurality of intermediate pulse subtrains, and buffer means for combining said intermediate pulse, subtrains to produce a final stepping pulse train for said readout.

7. Apparatus for controlling a readout, said apparatus comprising converting means for generating a clock pulse train of predetermined rate in response to an application of AC line power of predetermined frequency, said rate being functionally related to said frequency, divider means for generating a plurality of reference pulse subtrains in response to an application of said clock pulse train, said reference pulse subtrains being predeterminedly coded, input means for a plurality of selected signals corresponding to selected input information, gate means for processing corresponding ones of said selected signals and ones of said reference pulse subtrains in order to generate a plurality of intermediate pulse subtrains, buffer means for combining said intemediate pulse subtrains to produce a final stepping pulse train for said readout, and electromechanical stepping means responsive to said stepping pulse train for actuating an output printer, said electromechanical means including solenoid means.

8. The apparatus of claim 7 wherein said electromechanical means includes a controlled rectifier means for energizing said solenoid means.

9. The apparatus of claim 7 wherein said divider means is a decade divider means for processing consecutive sequences of ten pulses of said clock pulse train.

10. The apparatus of claim 7 wherein said electromechanical means includes a ten step print wheel.

11. The apparatus of claim 7 wherein said plurality of reference pulse subtrains is four in number.

12. The apparatus of claim 7 wherein said reference pulse subtrains within a preselected time interval constituting representing a binary coded decimal.

13. The apparatus of claim 7 wherein said gate means includes four gated channels for respectively receiving four selected signals from said input means and four selected reference pulse subtrains.

14. The apparatus of claim 7 wherein said gate means are AND gate means and said buffer means is an OR gate means.

References Cited

UNITED STATES PATENTS

| | | | |
|---|---|---|---|
| 2,538,122 | 1/1951 | Potter | 328—48 |
| 3,212,010 | 10/1965 | Podlesny | 328—41 |
| 3,219,895 | 11/1965 | Price | 318—20.310 |

MAYNARD R. WILBUR, Primary Examiner

J. GLASSMAN, Assistant Examiner

U.S. Cl. X.R.

318—18